United States Patent [19]

Cruickshank et al.

[11] 4,320,281
[45] Mar. 16, 1982

[54] LASER BONDING TECHNIQUE AND ARTICLE FORMED THEREBY

[75] Inventors: David G. Cruickshank, Hopewell Township, Mercer County; Robert Webb, Ewing Township, Mercer County, both of N.J.

[73] Assignee: Western Electric Company, Inc., New York, N.Y.

[21] Appl. No.: 174,052

[22] Filed: Jul. 31, 1980

[51] Int. Cl.³ ............................................. B23K 27/00
[52] U.S. Cl. ...................... 219/121 LD; 219/121 ED
[58] Field of Search ............... 219/121 LC, 121 LD, 219/121 L, 121 LM, 121 EC, 121 ED, 93, 56.1, 56.21, 56.22, 58; 338/329

[56] References Cited

U.S. PATENT DOCUMENTS

| | | | |
|---|---|---|---|
| 974,821 | 11/1910 | Lachman | 219/58 |
| 2,019,457 | 10/1935 | Lodge | 338/329 X |
| 3,060,356 | 10/1962 | Beyer | 361/308 |
| 3,267,249 | 8/1966 | Veth | 219/85 R |
| 3,437,736 | 4/1969 | Asher et al. | 338/329 |
| 3,463,898 | 8/1969 | Takaoka et al. | 219/121 LC |
| 3,610,874 | 10/1971 | Gagliano | 219/121 LD |
| 3,733,685 | 5/1973 | Kauppila | 228/110 |
| 4,136,298 | 1/1979 | Hansler | 219/121 LC X |

FOREIGN PATENT DOCUMENTS 52-38447 3/1977 Japan .......................... 219/121 LD

*Primary Examiner*—C. L. Albritton
*Attorney, Agent, or Firm*—D. J. Kirk

[57] ABSTRACT

Electrically conductive leads (12) are bonded to pre-tinned ends (11) of a thin film, rolled capacitor (10). A dimple (20) is formed in the leads (12) resulting in an indentation (21) therein and a protrusion (22) on the opposite surface thereof. The protrusion (22) is placed in contact with the end (11) and a pulsed laser beam directed into the indentation (21) to heat the lead (12) in the vicinity of the protrusion (22) to reflow a portion of the pre-tinned ends (11) to form a bond therebetween.

6 Claims, 4 Drawing Figures

LASER BONDING TECHNIQUE AND ARTICLE FORMED THEREBY

TECHNICAL FIELD

The instant invention is directed to forming bonds between articles. In particular, such bonds are formed using reflow bonding techniques.

BACKGROUND OF THE INVENTION

Heretofore it has been well known to bond electrically conductive leads to the ends of rolled metallized film capacitors or the like. The conductive leads and/or the metallized film capacitor ends are pre-tinned and brought into intimate contact. Heat is then applied to the leads by a contact device such as a heated ram, soldering iron or the like to reflow the pre-tinned material to effect a bond.

Such a technique has proved most effective in the past. However, with the ever increasing miniaturization of such capacitors, heat dissipation presents problems. Heat transferred, by a soldering iron or other relatively massive members, to such a miniature capacitor, as well as the force exerted thereon, can destroy or severely damage the capacitor.

One proposed solution to the bonding of leads to miniaturized capacitors is the use of a laser. The laser appears particularly attractive since it inherently provides a non-contacting method of bonding wherein a carefully controlled amount of heat is applied to the joint interface. Furthermore, such a laser technique may be fully automated and designed to operate at high production rates.

Unfortunately, most leads that are to be bonded to the ends of the components are highly reflective of the laser light resulting in poor optical coupling efficiency. Additionally, when relatively planar articles are brought together, high spots on one or more of the articles result in poor physical contact which can create voids in the reflowed solder.

SUMMARY OF THE INVENTION

The instant method overcomes the foregoing problem by forming an indentation in one surface of a first article resulting in a protrusion in the opposite surface thereof. The protrusion is placed against a second article with reflowable bonding material therebetween. A beam of high energy radiation is directed into the indented portion to heat said portion to reflow the reflowable bonding material to bond the first article to the second article.

Advantageously, the protrusion increases the active surface area at the bond interface.

Further, the indentation enhances the optical coupling efficiency by trapping an additional portion of the incident radiant energy therein.

Furthermore, the protrusion tends to localize and direct heat flow to the area to be bonded.

DETAILED DESCRIPTION

In an exemplary embodiment the instant invention is implemented to bond an electrically conductive lead to the end of a miniature capacitor. Such a disclosure is for purposes of exposition and not for limitation for the instant concepts can be applied to bonding of various leads or lead-like members to various articles such as other electronic components, leads, land areas or the like.

Figure 1:
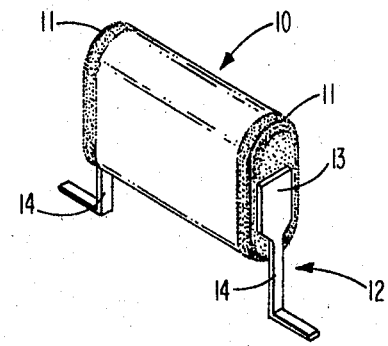
FIG. 1 is an isometric view of a miniature capacitor.

FIG. 1 is an isometric view of a rolled metallized film capacitor 10 having electrically conductive end portions 11—11. A lead 12 having a paddle shaped section 13 with a narrow lead 14 extending therefrom is solder bonded to each end portion 11.

Heretofore, the end portions 11—11 and/or the paddle 13 were pre-tinned with a solder (e.g., 60% tin and 40% lead) and placed in intimate contact. A heated ram, soldering iron or the like was brought into contact with the paddle 13 to transfer heat thereto and cause the solder to reflow to form a bond. Such a technique requires substantial heat and contact with a relatively massive heating tool.

Recent developments have led to the manufacture of zinc metallized polyester film miniature capacitors 10 having a substantially rectangular shape of about 0.075×0.125×0.175 inch. Capacitors 10 of such small size have been severely damaged due to the heat and/or the pressure exerted by the relatively massive electrodes used to apply the heat thereto.

In order to selectively apply heat to portions of the paddle 13 of the lead 12 in a non-contact fashion a beam of high energy radiation such as a laser beam has been used. However, it was quickly discovered that the conductive lead materials (e.g., phosphor bronze, copper, or the like) reflected a substantial portion of the laser light, requiring that the laser energy be increased. Additionally, the two relatively planar surfaces meeting at the bond interface resulted in poor contact due to high spots thereon which created voids in the reflowed solder material.

Figure 2:
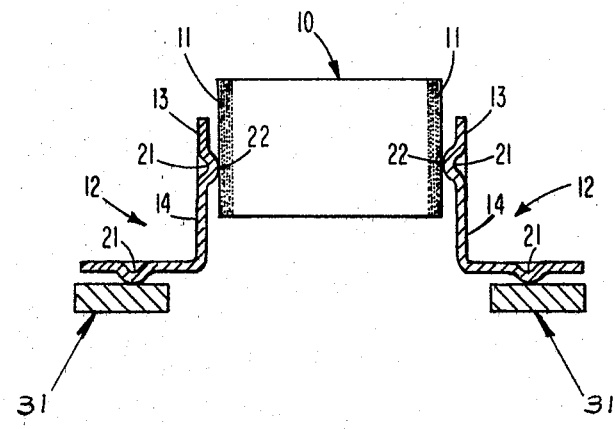
FIG. 2 is a side view of the miniature capacitor with conductive leads contacting the end portions thereof.
Figure 3:
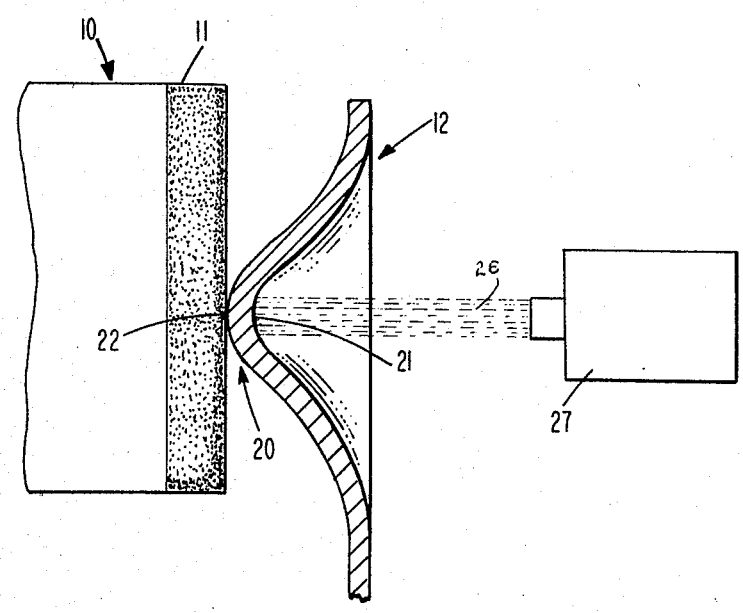
FIG. 3 is a partial cross-sectional view depicting the use of a laser to bond.

In order to overcome these problems, in accordance with the present invention, a hemispherical dimple 20 is formed in the paddle 13 of the lead 12 resulting in an indentation 21 on one side and a protrusion 22 on the opposite side of the lead as can be seen in FIGS. 2 and 3. FIG. 3 is an enlarged (not to scale) view of the dimple 20 with the protrusion 22 held in intimate contact with the pre-tinned end portion 11. A radiant energy beam 26 from a laser 27 is directed into the indentation 21 to provide heat thereto to reflow the pre-tinned material on the end portion 11 to bond the lead 12 thereto.

Figure 4:
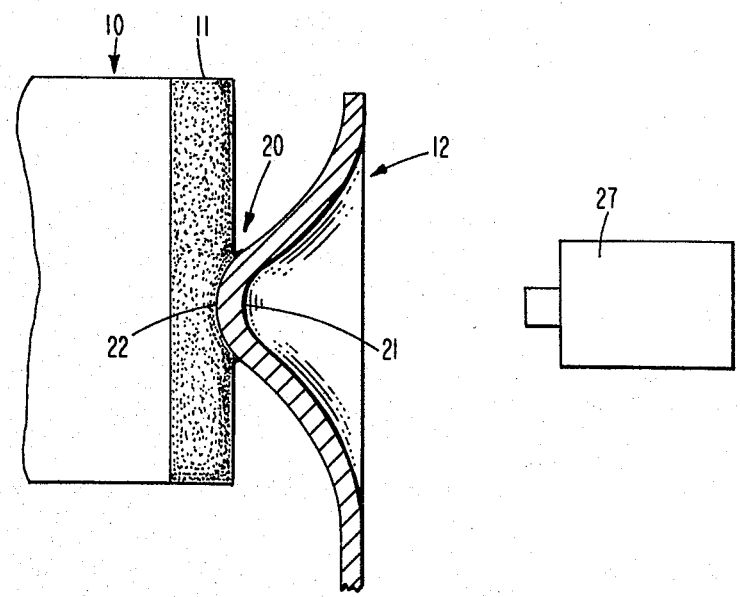
FIG. 4 is a partial cross-sectional view of the conductive lead bonded to the capacitor.

As the solder on the end 11 reflows (FIG. 4) it moves up the protrusion 22 contacting a substantial portion of the surface thereof. Additionally, by urging the lead 12 towards the end 11 as the solder reflows the protrusion 22 becomes further embedded in the molten solder resulting in greater bonding area and a highly reliable bond.

In addition, the hemispherical dimple 20 increases the active surface area at the bond interface as compared to a planar lead. The dimple 20 also has been found to enhance the optical coupling efficiency by trapping an additional portion of the incident focused laser beam 26 within the indentation 21.

FIG. 2 also shows a dimple 20 in the narrow lead 14 which may be connected to land areas 31 in the same manner the paddle 13 of the lead 12 was connected to the end portions 11. The protrusion 22 and/or the land area 31 may be coated with a reflowable bonding material and a beam of radiant energy directed into the indentation 21 to reflow the bonding material.

In an exemplary embodiment the lead 12 was 0.010 inch thick phosphor bronze, the dimple 20 had a nominal outside diameter of 0.023 inch, and its height from the plane of the contact interface was 0.007 inch. A pulsed Nd:YAG laser having a pulse length of 8 milliseconds at an energy level of 6.0 joules resulted in a pull strength of 2 pounds which is approximately 50 percent higher than the pull strength of members bonded which had a flat or planar interface. This is consistent with the fact that greater volume and surface area are affected with lead 12 having a dimple 20 therein.

Preferably, the lead ends 11—11 should be relatively smooth to guarantee a more reliable thermal contact prior to the instant bonding technique. In particular, this may be accomplished by wiping the ends 11—11 across a #400 fine grit flat sheet of crocus cloth or the like.

Additionally, by depositing a thin layer of solder in the indentation 21 the optical coupling of the high energy beam 26 to the indented lead 12 was improved. In an exemplary embodiment the lead 12 was solder coated on both sides and then the dimple 20 was formed therein.

It is to be understood that the embodiments described herein are merely illustrative of the principles of the invention. Various modifications may be made thereto by persons skilled in the art which will embody the principles of the invention and fall within the spirit and scope thereof. For example, the exemplary embodiment depicts a substantially hemispherical indentation which form the dimple 20. However, other indentations 21 such as triangular, pyramidal, conical, etc. can be used as long as the sides are inwardly sloping to focus the incoming radiant energy beam 26 towards the deepest section of the indentation.

What is claimed is:

1. A method of bonding a first article to a second article at respective bonding sites thereof, at least one of the articles having previously deposited reflowable bonding material at its bonding site, the method comprising:
    forming an indentation in the first article which results in a protrusion in the opposite surface of the article at its bonding site;
    placing the protrusion of the indented first article in contact with the second article at its bonding site;
    directing a beam of radiant energy into the indented portion of the first article to heat said portion and reflow the bonding material previously deposited on at least one of the bonding sites; and
    removing the beam to permit the reflowed material to solidify to form the bond between the first and second articles.

2. The method as set forth in claim 1 which comprises the additional step of:
    wiping the surface of the previously applied bonding material with a flat sheet of fine grit abrasive material prior to forming the bond.

3. The method as set forth in claim 1 wherein:
    the surface of the indentation has a thin layer of the reflowable bonding material therein.

4. The method as set forth in claim 1 wherein:
    the beam of radiant energy is supplied from a pulsed Nd:YAG laser having a pulse width of 8 milliseconds and an energy level of about 6 joules.

5. The method as set forth in claim 1 wherein:
    the first article is a substantially planar electrically conductive lead; and
    the second article is a capacitor.

6. The method as set forth in claim 1 which further comprises:
    urging the first article towards the second article as the bonding material reflows to embed the first article in the reflowed bonding material.

* * * * *